United States Patent [19]

Bolt

[11] Patent Number: 4,764,489
[45] Date of Patent: Aug. 16, 1988

[54] PREPARATION OF MIXED BORON AND ALUMINUM NITRIDES

[75] Inventor: John D. Bolt, Landenberg, Pa.

[73] Assignee: E. I. Du Pont de Nemours and Company, Wilmington, Del.

[21] Appl. No.: 131,380

[22] Filed: Dec. 10, 1987

[51] Int. Cl.⁴ .............................................. C04B 35/58
[52] U.S. Cl. ........................................ 501/96; 264/66; 423/290; 423/412
[58] Field of Search ............................. 501/96; 264/66; 423/290, 412

[56] References Cited

U.S. PATENT DOCUMENTS

| | | | |
|---|---|---|---|
| 3,711,594 | 1/1973 | Bienert et al. | 501/96 |
| 4,545,968 | 10/1985 | Hirano et al. | 501/96 |
| 4,642,298 | 2/1987 | Kuramoto et al. | 501/96 |
| 4,650,777 | 3/1987 | Kurokawa et al. | 501/96 |
| 4,666,873 | 5/1987 | Morris et al. | 501/96 |

FOREIGN PATENT DOCUMENTS 195060 10/1985 Japan ...................................... 501/96

Primary Examiner—John Doll
Assistant Examiner—Wayne A. Langel
Attorney, Agent, or Firm—James A. Costello

[57] ABSTRACT

Method for making a ceramic mixture of boron and aluminum nitrides in the ratio of about 0.2 to 20 g atoms of aluminum per g atom of boron, and method for making shaped articles of the ceramic and of the intermediate from which the ceramic is prepared, comprising the steps (i) reacting a boron nitrogen compound with an organoaluminum compound in a suitable solvent to form a shapeable intermediate, and (ii) heating the intermediate at temperatures and under conditions to effect formation of the mixed nitrides.

15 Claims, No Drawings

PREPARATION OF MIXED BORON AND ALUMINUM NITRIDES

BACKGROUND OF THE INVENTION

It is known to prepare boron nitride by heating boron amides, including borazine, or boron imides; see, for instance, "Borides: Their Chemistry and Applications, Thompson, Lecture Series No. 5, 1965, Royal Institute of Chemistry, London, pages 17 to 18; Ephraim's "Inorganic Chemistry", ed. Thorne & Roberts, 6th Ed., Interscience, N.Y. 1954, pages 662 to 664. Other methods include reaction of a boron halide or boric oxide with ammonia or nitrogen at 800° to 1500° C.

Preparation of aluminum nitride by reaction of trialkylaluminum and ammonia or other nitrogen hydride to form aluminum nitride is known: U.S. Pat. No. 3,922,475 discloses preparation of films of nitrides of Group III elements, including Al, by mixing volatile alkyl derivatives of said elements with ammonia or selected alkyl amines, as gases, and pyrolyzing the mixed gases or solid reaction product, optionally using a carrier gas such as helium. The intermediate reaction product, formulated for ammonia as $R_3M \cdot NH_3$ where M is a group III element and R is alkyl, is sometimes gaseous. The nitride final products are films deposited on insulating or semiconducting substrates.

Japanese application No. 78-68700 discloses reacting a hexane solution of triethylaluminum with ammonia, heating to evaporate solvent, then heating under vacuum at 1000° C. to obtain black aluminum nitride.

Myakininkov et al., Inorganic Materials (USSR), 10 (10), 1635 (1974) disclose deposition of aluminum nitride films onto silicon semiconducting substrates by gaseous reaction of $Al(C_2H_5)_3$ and hydrazine with helium as a carrier gas at a temperature in the range 750° to 1000° C.

Bahr, FIAT, Rev. Ger. Sci., Inorg, Chem. II, 155 (1948) discloses the reaction of trimethylaluminum and ammonia to form a 1:1 adduct which, on heating at gradually higher temperatures, forms dimethylaluminum amide, then polymeric aluminum amides and finally aluminum nitride.

Japanese application No. 54-013,439 discloses the reaction of trialkylaluminum with ammonia or a primary or secondary amine in hydrocarbon solution to form an aluminum nitride precursor containing at least one Al—N bond. The precursor is converted to aluminum nitride powder by heating it above 400° C. in the presence of an inert gas, vacuum or ammonia gas. High purity aluminum nitride is achieved by heating at a rate of less than 400°/h.

Interrante, at a meeting of the Materials Research Society, April 1986, Palo Alto, Calif. disclosed the stepwise reaction of trialkylaluminum compounds $R_3Al$, where R is $C_{1-4}$ alkyl, with ammonia to form aluminum nitride. Trimethylaluminum was reacted with ammonia at low temperatures of about $-78°$ in a hydrocarbon solvent, to form a 1:1 adduct. The adduct lost methane on heating at or above 70° to give dimethylaluminum amide. Heating at 160° to 200° leads to further loss of methane to give $CH_3AlNH$. Final conversion of $RAlNH$ to $AlN$ powder was achieved by heating at 1000° C.

Preparation of mixed boron and aluminum nitrides is also known. Japanese application No. 62-56307 discloses preparation of a uniform mixture of boron nitride and aluminum nitride powders by reacting a boron compound such as boric acid, boron oxide, borates, boron halides and metal borides with nitrogen or a nitrogen-containing compound such as ammonia, urea, dicyandiamide, melanine or ammonium chloride in the presence of aluminum nitride powder. Japanese application No. 62-65980 discloses preparation of an intimate mixture of boron nitride and aluminum nitride powders by reacting an aluminum compound with nitrogen or a nitrogen-containing compound in the presence of high purity boron nitride powder.

U.S. Pat. No. 4,642,298 discloses preparation of a composite sintered body consisting essentially of aluminum nitride, boron nitride and at least one compound of a Gp IIa or IIIa metal, especially calcium, strontium or barium, or yttrium or lanthanum-group metal. The components are conventionally mixed together, then sintered at 1600° to 2400° in an inert atmosphere. U.S. Pat. No. 4,666,873 discloses preparation of shaped articles of mixed boron and aluminum nitrides having from about 0.01 to 35 volume percent of boron nitride, by mixing powders of the individual nitrides of at least about 95% purity, molding the mixture and densifying in a non-oxidizing atmosphere to form a structural ceramic. The aluminum nitride has no particles greater than about 74 $\mu$m in size, the boron nitride no greater than about 10 $\mu$m.

Structural and physical studies of blends of aluminum nitride and boron nitride containing 5 to 30% BN, prepared from powdered components, are reported by Mazdiyasni et al. Amer. Cer. Soc. Bull., 64(8), 1149 (1985).

Lyutaya et al., Izvest. Akad. Nauk SSSR, Engl Transl, Inorganic Materials, 9(8), 1214 (1973), disclose complex nitrides of Al and B by nitriding complex salts of B and Al in ammonia. No experimental details are provided, but various complex nitrides of empirical formula $Al_{1.2}B_{0.2}N$ to $Al_{0.61}B_{0.63}N$ were prepared and studied by X-ray diffraction. Evidence of solid solution formation is presented.

SUMMARY OF THE INVENTION

The present invention concerns preparation of ceramic compositions of intimately mixed boron and aluminum nitrides comprising reacting one or more organoaluminum compounds with one or more boron nitrogen compounds to form at least one shapeable intermediate, followed by heating to form a structural Al/B nitride ceramic. The process of this invention comprises:

(i) reacting a boron nitrogen compound which contains the elements boron, nitrogen, hydrogen and, optionally, carbon and silicon, with an organoaluminum compound which contains the elements aluminum, carbon, hydrogen and, optionally, nitrogen, to form a shapeable intermediate;

(ii) heating said intermediate by raising the temperature from about 250° C. up to about 1400° to 2000° C. to form said ceramic composition.

The shapeable intermediates of step (i) can be prepared by molding, spinning, casting or extruding, followed by subjecting the shaped intermediate(s) to the step (ii) heating. If the intermediate is in the form of powder, shaping (molding) can be accomplished before or after step (ii). Steps (i) and (ii) require an appropriate environment; an inert atmosphere or vacuum are suitable for step (i), an ammoniacal or inert atmosphere or vacuum for step (ii). The preferred atmospheres for steps (i) and (ii) are nitrogen and ammonia, respectively; it has been found convenient to employ nitrogen in the latter stages of step (ii), at the more elevated temperatures.

The ceramic compositions made as described herein, contain about 0.2 to 20 g atoms of aluminum per g atom of boron, preferably from about 0.5 to 10 g atoms of aluminum per g atom of boron. The ceramic compositions made by the method of this invention are characterized by good strength and thermal conductivity and by a distinctive X-ray diffraction pattern.

DETAILS OF THE INVENTION

Preferred organoaluminum compounds for use in this process are those of the formula $[R_{3-x}AlY_z]_n$ wherein:

Y is H, $NR^1{}_{3-m}$, NCR or $NCR_2$;

each R, independently, is $C_{1-10}$ hydrocarbyl which can be aliphatic, aromatic or mixed aliphatic-aromatic;

each $R^1$, independently, is H or $C_{1-10}$ hydrocarbyl defined as for R;

m, x and z, independently, are 0, 1 or 2;

n is an integer of at least 1.

Preferably R is $C_{1-4}$ alkyl and $R^1$ is H or $C_{1-4}$ alkyl; methyl or ethyl groups are most preferred. It will be understood that the organoaluminum compounds wherein z is other than 0 and Y is other than H include complexes of simple trialkylaluminum compounds with ammonia, amines, nitriles and rearrangement products of nitriles; and, when n is >1, polymeric compounds are included, e.g., $(RAlNH)n$. Also useful are products of reaction of said polymers with trialkylaluminum compounds. Especially preferred organoaluminum compounds include triethylaluminum, trimethylaluminum, diethylaluminum hydride, diethylaluminum amide and ethylaluminum imide.

Preferred boron nitrogen compounds are compounds having the formula $[R^1{}_pBNR'_q]_r$ or $B_vH_t[NR^1{}_{3-m}]_s$ wherein:

$R^1$ is defined as above;

each R', independently, is H, $C_{1-10}$ hydrocarbyl defined as for R, or $SiR''_3$ wherein R'' is R or $NR^1{}_2$ and $R^1$ is defined as above;

p and q, independently, are integers of 1-3;

r is an integer of 1 to 4;

v is an integer of at least 2;

t is an integer equal to (v+3) or (v+4);

s is an integer equal to, or less than, v;

$R^1$ and m are defined as above.

Preferably r is 1 or 3, v is 2 to 10 and t is (v+4).

Compounds embraced by the first formula include borazine (borazole), substituted borazines, aminoboranes or amine-borane complexes. The borazines are preferred.

Compounds embraced by the second formula include adducts of boron hydrides with ammonia or amines. Specific examples include $B_2H_6[2NH_3]$, $B_2H_5NH_2$, $B_3H_7[NH_3]$, $B_5H_9[2NH_3]$ and $B_{10}H_{14}[NH_3]_s$ wherein s is 3, 4 or 6.

Also contemplated as operable boron nitrogen compounds are ammonia or amine adducts of carboranes such as those of the formula $B_3H_3(C_2H_2)$ or $B_4H_4(C_2H_2)$.

Use of a solvent in the invention process is preferred but not essential. Suitable solvents include any organic liquid wherein the reactants are soluble or dispersible which is inert under reaction conditions. Representative examples include: aliphatic and aromatic hydrocarbons such as hexane, octane, xylene and toluene; ethers such as diethyl ether, dioxane, and tetrahydrofuran; and halogenated hydrocarbons such as ohloroform, methylene chloride, and chlorobenzene.

For process step (i), reaction temperatures are usually from room temperature to about 250° C., preferably to about 100° C. Most conveniently, the reactants and solvent, if any, are mixed at room temperature and either heated externally or by exothermic reaction, to reflux. Pressure is not critical and can be below or above atmospheric pressure; atmospheric pressure is preferred. Reaction times vary from several minutes to several hours. The reaction should be conducted in an atmosphere wherein water and oxygen are excluded. Nitrogen or argon are suitable. If a solvent has been used, it is removed after the reaction by distillation, preferably at reduced pressure.

The intermediates prepared in step (i) can be particulate or nonparticulate. The latter intermediates are either thermoplastic or readily plasticised by solvents or low molecular weight compounds and are thus shapeable (processible) by conventional means such as molding, spinning, casting, extrusion and the like. Fibers are a preferred form of article, preparable by spinning from the melt, plasticized melt or solution.

The intermediate prepared in step (i), in particulate or shaped form, is then subjected to the carbon-removal step, heating (pyrolysis) step (ii) of the invention process. Step (ii) is conducted under vacuum or in an atmosphere which is inert or ammoniacal. By "ammoniacal" is meant an atmosphere containing ammonia, hydrazine or similar nitrogeneous compound. An atmosphere of ammonia or a mixture of ammonia and an inert gas such as nitrogen or argon are preferred.

A pyrolysis temperature of at least about 250° C. is preferred for complete removal of carbonaceous matter. Temperatures above about 400° are best because the products formed at 350° to 400° have higher surface areas and are relatively sensitive to moisture and oxygen which introduce undesirable oxygen into the product. It is convenient to heat in ammonia to 900° C. or higher before removing the pyrolysis product from the reactor, and handling the pyrolysis product in air should be avoided until step (ii) is completed. Pyrolysis pressure is not critical; pressures from a few hundreths of an atmosphere to tens of atmospheres are suitable. However, atmospheric pressure is preferred. Pyrolysis can normally be achieved by introducing the product of step (i) to the heating regimen of step (ii) at room temperature and heating at acceleration increments of about 1° to 50° C./min, preferably about 1° to 10° C./min.

During final conversion to the ceramic compositions in the latter stage of step (ii), the pyrolysis products, whether particulate or shaped, are densified by the heating regimen. Heating rates and pressures are not critical. The temperature chosen should be sufficient to densify the product, normally from about 1400° to less than 1800° C. is suitable. Sintering aids are not usually required, except when the pyrolysis products are particulate.

Boron nitride and aluminum nitride are high temperature (refractory) ceramic materials. A mixture of these nitrides, when formed into a dense "mixed" ceramic, is known to possess useful properties such as low dielectric constant, thermal shock resistance which is superior to AlN alone, and improved mechanical toughness, spall resistance, erosion and ablation resistance (U.S. Pat. No. 4,666,873). The mixed AlN/BN ceramic has a low coefficient of thermal expansion and is machinable (U.S. Pat. No. 4,642,298). For structural applications, strength, thermal expansion, thermal shock resistance, erosion and corrosion resistance, toughness and machinability are desirable characteristics in a ceramic material. Thus AlN/BN ceramics are not only useful, but can also be superior to the individual component nitrides. High thermal conductivity and low dielectric constants possessed by the mixed ceramics are desirable characteristics in electronic applications as dielectric (insulating) components of microelectronic packages. These properties can be "tailored" to meet specific requirements by varying the ratio of Al and B in the mixed ceramic.

Conventional ceramic processing techniques combine powders of the individual ceramics, AlN and BN, then densify by hot pressing (a low productivity, expensive technique) or by adding liquid phase sintering aids. These liquid phase sintering aids can be harmful, especially to high temperature structural properties. With or without sintering aids, the conventional methods require temperatures in excess of 1800° C. to densify the ceramic parts. Lower temperatures are desirable to save energy and utilize less expensive furnaces. Moreover, conventional ceramic strengths are limited by the number and size of defects which are related to the particle sizes of the component nitrides. Thus, the strength of AlN/BN ceramics will be influenced by the degree of mixing and the particle sizes of the components, and the extent to which they aggregate during densification.

The advantages of AlN/BN ceramic prepared in accordance with this invention arise from the uniquely intimate mixture of AlN and BN produced by the present process wherein AlN and BN precursors are chemically mixed by co-reaction and then converted to a mixed ceramic. As a consequence, individual particles contain uniform proportions of both nitrides and have relatively uniform sizes. The mixing and agglomeration problems inherent in conventional preparations of AlN/BN are thus avoided. In shaped articles formed from polymeric reaction products of step (i), mixing is again equally and inherently intimate, and this uniformity is preserved in the final ceramic article.

Oxygen contamination is usually present in conventional AlN/BN ceramics because the component commercial powders of AlN and BN are contaminated by oxygen, typically 0.5% to 1.5% by weight. Particulate AlN/BN prepared by the invention process can contain as little as 0.08% oxygen. Preferred ceramic compositions of this invention are those that contain no more than about 0.4% oxygen. Oxygen is especially detrimental in applications requiring high thermal conductivity because of the oxygen sensitivity of this property.

In the following Examples of specific embodiments of the invention, parts and percentages are by weight and temperatures are in degrees Celsius unless otherwise specified.

EXAMPLE 1

All work was performed in a nitrogen filled dry-box. To a solution of 44.74 g (0.62 mole) of trimethylaluminum in 80 ml of hexane, a solution of 20 ml (0.21 mole) of borazine in 55 ml of hexane was added dropwise while stirring over about 30 min. Gas was evolved during the reaction and the temperature rose until reflux was attained. Heat was applied to maintain the reaction at reflux for 60 min. A precipitate formed during the reaction. As the reaction cooled stirring was continued. The precipitate was collected by filtration and washed with hexane. Residual solvent was removed by heating gently for two hours in vacuum then by vacuum overnight at room temperature. An amount of 37.7 g of product was recovered of which 15.01 g was pyrolyzed in an ammonia atmosphere by heating at 3°/min. to 300°, then heating rapidly to 1000°, yielding 10.16 g. Then, 9.0 g of the ammonia pyrolysis product was heated in nitrogen in a carbon furnace to 1811°; 8.7 g was recovered. The final product was analyzed for Al, B, N and O: Al=54.90%, B=7.50%, N36.27%, C=1.57%, and O=0.078% (Al:B atomic ratio=2.9:1). Separate samples of the ammonia pyrolysis product heated in nitrogen to 1513°, 1650°, and 1800° had surface areas of 1.39, 1.03, 1.08 m$^2$/g, respectively. All three samples showed sharp X-ray powder diffraction peaks corresponding to AlN and a very weak and broad diffraction near the scattering angle expected for the (002) peak of hexagonal BN.

EXAMPLE 2

Triethylaluminum (25.6 g, 0.224 mole) was dissolved in 63 ml of hexane followed by addition of 6.6 ml (0.069 mole) of borazine added by syringe with stirring over about 10 min. The reaction temperature increased to reflux and the reaction mixture was heated to maintain reflux for 40 min. Solvent was removed under vacuum leaving a highly viscous product (21.4 g). Residual solvent was removed under vacuum overnight leaving 20.57 g of solid. This product was pyrolyzed in ammonia as in Example 1, and further heated in nitrogen to 1801°. The final product contained Al=51.42%, B=7.54%, N=36.38%, C=0.19%, O=0.65%.

EXAMPLES 3 to 7

A series of organoaluminum compounds were reacted in solution with borazine. In examples 4 to 7, gas evolved upon mixing. In all Examples, the reactions were refluxed for 15 to 45 min, and solvent was removed to obtain the reaction product. The products were pyrolyzed by heating to 900° in ammonia atmosphere and the pyrolysis products were analyzed for Al, B, and nitrogen. The reactions and products are summarized in the Table:

TABLE

| | Borazine (mmoles) | Organo-aluminum (mmoles) | Solvent (volume) | Reaction Product | Pyrolysis Product Al:B atomic ratio |
|---|---|---|---|---|---|
| 3. | 5.2 | Et$_2$AlNH$_2$ (15.8) | toluene (10 ml) | solid | 2.7:1 |
| 4. | 10.4 | Et$_2$AlH (31.4) | toluene (20 ml) | solid | 1.3:1 |
| 5. | 20.8 | Et$_3$Al (20.8) | hexane (20 ml) | solid | 0.77:1 |
| 6. | 20.8 | Et$_3$Al (41.6) | hexane (20 ml) | solid | 1.3:1 |
| 7. | 10.4 | Et$_3$Al (41.6) | hexane (20 ml) | highly viscous fluid | 5.4:1 |

EXAMPLE 8

An amount of 0.31 g (0.01 mole) of borane-ammonia complex was added with stirring to 1.14 g (0.01 mole) of triethylaluminum. As it dissolved, gas evolved slowly. The reaction was heated to increase the rate of dissolution and gas evolution and finally resulted in a very rapid evolution of gas leaving a solid foamy residue.

This product was heated in ammonia to 900° at 3°/min. Elemental analysis gave a Al:B atomic ratio of 3:1.

EXAMPLE 9

An amount of 0.01 mole of borane(tert)butylamine complex was added to 0.01 mole of diethylaluminumamide ($Et_2AlNH_2$) with stirring. Gas evolved and, with slow heating to 120°, became vigorous. Upon further heating the viscosity increased, resulting in a foamy, thermoplastic product. Fibers could be pulled from the melt. The procuct hardened upon further heating. Boron and aluminum were detected in the elemental analysis.

EXAMPLE 10

An amount of 0.01 mole of borane-dimethylamine complex was added to 0.01 mole of diethylaluminum amide. Gas evolved as the temperature was raised above 110°. At 138° the reaction proceeded vigorously and the viscosity increased. On cooling a clear glassy solid remained.

The embodiments of the invention in which an exclusive property or privilege is claimed are defined as follows:

1. A process for preparing a ceramic composition comprising intimately mixed aluminum nitride and boron nitride, said process comprising
   (i) reacting a boron nitrogen compound which contain the elements boron, nitrogen, hydrogen and, optionally, carbon and silicon, with an organoaluminum compound which contain the elements aluminum, carbon, hydrogen and, optionally, nitrogen to form an intermediate; and
   (ii) heating said intermediate by raising the temperature from about 250° C. up to about 1400° to 2000° C. to form said ceramic composition.

2. A process acoording to claim 1 wherein the organoaluminum compound is selected from at least one member of the group having the formula $$(R_{3-x}AlY_z)_n$$

wherein:
Y is H, $NR^1_{3-m}$, NCR or $NCR_2$;
R, independently, is $C_{1-10}$ hydrocarbyl which can be aliphatic, aromatic or mixed aliphatic-aromatic;
$R^1$, independently, is H or $C_{1-10}$ hydrocarbyl which can be aliphatic, aromatic or mixed aliphatic-aromatic;
m, x and z, independently, are 0, 1 or 2; and
n is an integer of at least 1: and wherein the boron nitrogen compound is selected from at least one member of the group having the formula $$(R^1_pBNR'_q)_r \text{ or } B_vH_t(NR^1_{3-m})_s$$

wherein:
$R^1$, independently, is H or $C_{1-10}$ hydrocarbyl which can be aliphatic, aromatic or mixed aliphatic-aromatic;
R', independently, is H, C1–10 hydrocarbyl which can be aliphatic, aromatic or mixed aliphatic-aromatic, or $SiR''_3$;
R'' is R or $NR^1_2$ and $R^1$ is independently H or $C_{1-10}$ hydrocarbyl which can be aliphatic, aromatic or mixed aliphatic-aromatic;
m is 0,1 or 2;
p and q, independently, are integers of 1 to 3;
r is an integer of 1 to 4;
v is an integer of at least 2;
t is an integer equal to (v+3) or (v+4);
s is an integer equal to or less than v.

3. A process according to claim 2 wherein R is $C_{1-4}$ alkyl, $R^1$ is H or $C_{1-4}$ alkyl, r is 1 or 3, v is 2 to 10 and t is (v+4).

4. A process according to claim 3 wherein the organoaluminum compound is selected from the group triethylaluminum, trimethylaluminum, diethylaluminum hydride, diethylaluminum amide and ethylaluminum imide, and the boron nitrogen compound is selected from the group borazines, substituted borazines, aminoboranes, amine-borane complexes, adducts of boron hydrides with ammonia and with amines.

5. A process according to claim 4 wherein the boron adducts are selected from the group $B_2H_6[2NH_3]$, $B_2H_5NH_2$, $B_3H_7[NH_3]$, $B_5H_9[2NH_3]$ and $B_{10}H_{14}[NH_3]_s$, wherein s is 3, 4 or 6, and ammonia or amine adducts of carboranes of the formula $B_3H_3(C_2H_2)$ and $B_4H_4(C_2H_2)$.

6. A process according to claim 1 wherein step (i) is carried out in an inert atmosphere or under vacuum and step (ii) is carried out in an ammoniacal or inert atmosphere or under vacuum.

7. A process according to claim 6 wherein the intermediate is pyrolyzed by heating to at least 900°.

8. A process according to claim 1 wherein the heating rate acceleration in step (ii) does not exceed about 10°/min.

9. A process according to claim 1 wherein a solvent is employed.

10. A process according to claim 9 wherein the solvent is a liquid hydrocarbon.

11. A process according to claim 2 wherein a solvent is employed.

12. A process according to claim 11 wherein the solvent is a liquid hydrocarbon.

13. A process for making a ceramic composition comprising shaping the intermediate produced by reacting a boron nitrogen compound which contains the elements boron, nitrogen, hydrogen and, optionally, carbon and silicon, with an organoaluminum compound which contains the elements aluminum, carbon, hydrogen and optionally, nitrogen, in a solvent for the reactants, pyrolyzing said shaped intermediate by heating at a rate not exceeding 50°/min to a temperature of at least about 250°, and heating the pyrolyzate at a temperature of about 1400° to 2000° to form said ceramic composition.

14. A process according to claim 13 comprising selecting the organoaluminum compound from at least one member of the group having the formula $$(R_{3-x}AlY_z)_n$$

wherein:
Y is H, $NR^1_{3-m}$, NCR or $NCR_2$;
R, independently, is $C_{1-10}$ hydrocarbyl which can be aliphatic, aromatic or mixed aliphatic-aromatic;
$R^1$, independently, is H or $C_{1-10}$ hydrocarbyl which can be aliphatic, aromatic or mixed aliphatic-aromatic;
m, x and z, independently, are 0, 1 or 2; and
n is an integer of at least 1; and selecting the boron nitrogen compound from at least one member of the group having the formula $$(R^1_pBNR'_q)_r \text{ or } B_vH_t(NR^1_{3-m})_s$$

wherein:
- $R^1$, independently, is H or $C_{1-10}$ hydrocarbyl which can be aliphatic, aromatic or mixed aliphatic-aromatic;
- $R'$, independently, is H, $C_{1-10}$ hydrocarbyl which can be aliphatic, aromatic or mixed aliphatic-aromatic, or $SiR''_3$;
- $R''$ is R or $NR^1_2$ and $R^1$ is independently H or $C_{1-10}$ hydrocarbyl which can be aliphatic, aromatic or mixed aliphatic-aromatic;
- m is 0, 1 or 2;
- p and q, independently, are integers of 1 to 3;
- r is an integer of 1 to 4;
- v is an integer of at least 2;
- t is an integer equal to (v+3) or (v+4);
- s is an integer equal to or less than v.

15. A process according to claim 14 wherein the organoaluminum compound is selected from the group triethylaluminum, trimethylaluminum, diethylaluminum hydride, diethylaluminum amide and ethylaluminum imide, and the boron nitrogen compound is selected from the group borazines, substituted borazines, aminoboranes, amine-borane complexes, adducts of boron hydrides with ammonia and with amines, and the boron compounds are adducts selected from the group $B_2H_6[2NH_3]$, $B_2H_5NH_2$, $B_3H_7[NH_3]$, $B_5H_9[2NH_3]$ and $B_{10}H_{14}[NH_3]_s$ wherein s is 3, 4 or 6, and ammonia or amine adducts of carboranes of the formula $B_3H_3(C_2H_2)$ and $B_4H_4(C_2H_2)$.

* * * * *